3,719,810
ANALOG CIRCUITS FOR CALCULATING RELATIVE HUMIDITY FROM DEW POINT AND DRY BULB TEMPERATURE INFORMATION
Norman C. Ahlquist and Robert J. Charlson, Seattle, Wash., assignors to Battelle Development Corporation, Columbus, Ohio
Filed Dec. 15, 1971, Ser. No. 208,148
Int. Cl. G06g 7/32; G01w 1/10
U.S. Cl. 235—151.3
24 Claims

ABSTRACT OF THE DISCLOSURE

Analog circuits for calculating relative humidity from dew point and dry bulb temperature information in accordance with the Clausius-Clapeyron equation are described. Transducers generate two linear current signals—one proportional to the dry bulb temperature and the other proportional to the dew point temperature. An analog computer acts on the two signals in accordance with the Clausius-Clapeyron equation to produce an output voltage proportional to the relative humidity. The analog computer acts in accordance with either the exact form of the Clausius-Clapeyron equation or a modified form, depending upon the embodiment of the invention being used.

BACKGROUND OF THE INVENTION

The invention described herein was made during the course of, or under, a grant from the Department of Health, Education and Welfare.

This invention relates to apparatus for determining relative humidity and more particularly to electronic circuits suitable for calculating relative humidity from sensed information.

A variety of reliable instruments exist for measuring the dew point of air and other gases. These devices provide a true thermodynamic measure of the amount of water vapor in such gases. While dew point data is quite useful, it is often not as useful as other data, such as data about the relative humidity of a gaseous sample, for example.

While various attempts have been made to provide an instrument that generates an output signal that is an accurate function of relative humidity, in general, these attempts have been unsuccessful. In many cases, the proposed instruments have been electronically unduly complicated. In addition, many of them, such as the device described in U.S. Pat. 2,638,783 to Rittner et al., depend upon specially prepared temperature sensors that have an exponential response. Hence, prior art relative humidity instruments are generally expensive because they utilize special expensive components and/or because they utilize complicated, expensive electronic systems. In addition, many prior art instruments, such as the device described in the Rittner et al. patent, require that a plurality of measurements be performed in order to provide an indication of relative humidity. That is, measurements of such items as partial pressure and barometric prtssure must be made, in addition to temperature measurements, before an accurate indication of relative humidity can be provided.

Therefore, it is an object of this invention to provide a new and improved apparatus for calculating relative humidity.

It is also an object of this invention to provide a relatively uncomplicated apparatus for calculating relative humidity from a minimum number of sources of information about the gaseous atmosphere whose relative humidity is to be measured.

It is a still further object of this invention to provide an analog circuit that calculates relative humidity from dew point and temperature information and operates in accordance with the Clausius-Clapeyron equation.

SUMMARY OF THE INVENTION

In accordance with principles of this invention analog circuits for calculating relative humidity from dew point and temperature information are provided. In one form, the analog circuit operates in accordance with a modified form of the Clausius-Clapeyron equation to provide an output signal that is highly accurate even though not exactly related to relative humidity. In another form, the analog circuit operates exactly in accordance with the exact form of the Clausius-Clapeyron equation to provide an output which is exactly related to relative humidity.

In accordance with other principles of this invention, the analog circuit that operates in accordance with a modified form of the Clausius-Clapeyron equation receives two input signals, one related to the dry bulb temperature of the gaseous medium whose relative humidity is to be measured and the other related to the dew point. The two input signals are combined with a constant signal to provide desired signals related to the numerator and denominator of the exponential portion of the modified Clausius-Clapeyron equation. The desired signals are combined and then divided in a suitable divider circuit to provide a signal related to the exponent. This signal is applied to a suitable exponential amplifier to obtain the antilog thereof. The antilog signal is directly related to the relative humidity of the gaseous medium except for the slight error caused by the modification of the Clausius-Clapeyron equation.

In accordance with alternate principles of this invention, an analog circuit similar to the foregoing analog circuit is utilized by the invention. However, in addition, a multiplier circuit is added which multiplies together certain of the desired signals applied to the input of the divider and adds the results of the multiplication to the input of the divider along with the other signals applied to the divider. This modification makes the analog circuit operate in accordance with the exact form of the Clausius-Clapeyron equation whereby the antilog signal is exactly related to the relative humidity of the gaseous medium.

It will be appreciated from the foregoing brief description that uncomplicated analog circuits for either the exact or a modified solution to the Clausius-Clapeyron equation are provided by the invention. The circuits provide an output voltaoge which is directly readable by a suitable instrument calibrated in terms of relative humidity. The temperature sensing devices used by the invention to sense dry bulb and dew point temperatures are relatively uncomplicated in that they can be either precision thermistors or temperature sensitive resistors, as desired. All that is necessary is that the sensors be linear over the range of interest. Moreover, the analog circuits are relatively uncomplicated and therefore inexpensive to manufacture and use. That is, the analog circuit that op- Clausius-Clapeyron equation merely comprises a pair of input circuits for combining the sensed temperature signals, a divider for dividing the combined signals and an exponential amplifier circuit for providing the antilog of the division signal. The analog circuit operating in accordance with the exact solution of the Clausius-Clapeyron equation is only slightly more complicated in that it also requires a multiplier circuit for obtaining an additional term to be utilized in the solution. Hence, the invention not only utilizes uncomplicated components, it is electronically uncomplicated and, therefore, suitable for widespread use.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
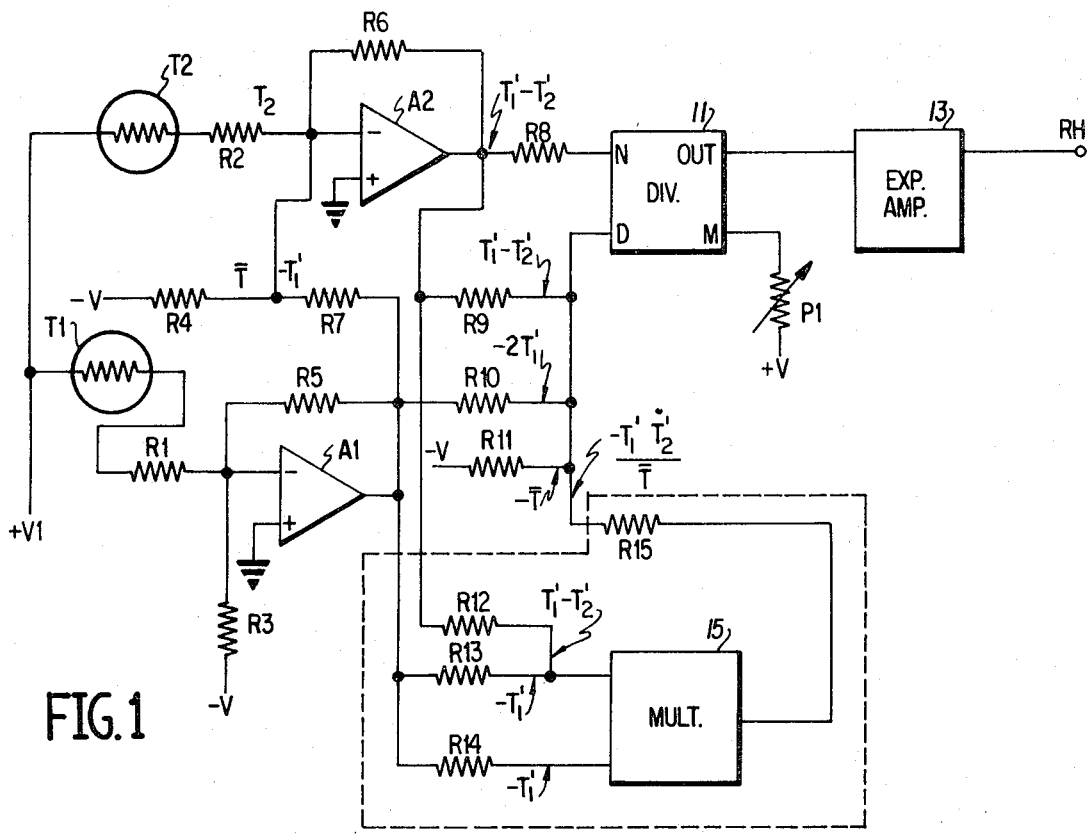
FIG. 1 is a partially block and partially schematic diagram illustrating an analog circuit formed in accordance with the invention for solving in accordance with the modified form of the Clausius-Clapeyron equation and includes inside of a dashed block a modification thereto that allows the circuit to solve in accordance with the exact form of the Clausius-Clapeyron equation.

Prior to describing the analog circuits formed in accordance with the invention, the following brief discussion of the Clausius-Clapeyron equation basis for the operation of the circuits is described.

The operative basis for the analog circuits formed in accordance with the invention is the relationship between saturation vapor pressure and temperature described by the Clausius-Clapeyron equation. More specifically, the Clausius-Clapeyron equation formally states:

$$\ln \frac{P_2}{P_1} = -\frac{\Delta H}{R}\left(\frac{1}{T_2} - \frac{1}{T_1}\right) \quad (1)$$

where: $\Delta H$ equals the heat of vaporization; R equals the gas constant; T equals temperature; and, $P_i$ equals the partial pressure of $H_2O$ at temperature $T_i$ (where $i$ equals 1 or 2).

If $P_1$ is the saturation vapor pressure at $T_1$, then $T_1$ is the dew point. That is, if $P_2/P_1=1$, the air is saturated and $T_2=T_1$. Usually, however, $T_2$ is greater than $T_1$ so that $P_2/P_1$ (the relative humidity or R.H.) is less than unity.

The invention utilizes the foregoing equation (after suitable, hereinafter described, transformations are made) as the basis for an analog computer. That is, the invention obtains electrical signals that are known, simple functions of absolute temperatures $T_1$ and $T_2$ and modifies these signals in accordance with the foregoing equation to derive a signal directly related to relative humidity.

Since $\Delta H$ and R can be empirically calculated, the only equation necessary for the analog computer to calculate is:

$$\ln RH \propto \left(\frac{1}{T_2} - \frac{1}{T_1}\right) \quad (2)$$

It will be appreciated by those skilled in the art and others that the foregoing equation is not in the most desirable form for analog computation. That is, this equation is in undesirable form because it requires the inclusion of two dividers that must be very accurate if the difference in absolute temperatures to be detected is less than one percent. Such a small difference occurs at RH above 85%. This problem can, however, be eliminated by changing the foregoing equation to the form:

$$\ln RH \propto \left(\frac{T_1 - T_2}{T_1 T_2}\right) \quad (3)$$

The foregoing equation eliminates the above discussed difficulties since the numerator goes to 0 at 100% RH.

Since $T_1$ and $T_2$ can vary, they can each be considered to be the sum of a constant plus a perturbation. That is, they can be described as:

$$T_1 = \overline{T} + T_1' \quad (4)$$

$$T_2 = \overline{T} + T_2' \quad (5)$$

Consequently, the right hand side of Equation 3 can be written as:

$$\frac{(\overline{T} + T_1') - (\overline{T} + T_2')}{(\overline{T} + T_1')(\overline{T} + T_2')} \quad (6)$$

solving this equation results in the following equation:

$$\frac{T_1' - T_2'}{\overline{T}^2 + T_1'\overline{T} + T_2'\overline{T} + T_1'T_2'} \quad (7)$$

dividing by $\overline{T}$ results in the following equation:

$$\frac{\dfrac{T_1' - T_2'}{\overline{T}}}{\overline{T} + T_1' + T_2' + \dfrac{T_1' T_2'}{\overline{T}}} \quad (8)$$

$\overline{T}$ can be removed from the denominator portion of the numerator of this equation because it is a constant resulting in:

$$\ln RH \propto \frac{T_1' - T_2'}{\overline{T} + T_1' + T_2' + \dfrac{T_1' T_2'}{\overline{T}}} \quad (9)$$

The foregoing equation is an exact, albeit translated, form of the Clausius-Clapeyron equation with constants removed and is in suitable form for analog computation.

It will be appreciated by those skilled in the art and others that $T_1' \ll \overline{T}$ and $T_2' \ll \overline{T}$ and when $\overline{T}$ is appropriately chosen. Consequently, the last term of the denominator of Equation 9 is very small compared to the other three terms whereby it can be eliminated for all practical purposes. In other words, Equation 9 can be approximated by the following equation:

$$\ln RH \approx \frac{T_1' - T_2'}{\overline{T} + T_1' + T_2'} \quad (10)$$

The foregoing equation is quite accurate since at 300° K. a range of $T_1'$ and $T_2'$ of ±15° K results in an error of only about ±½% RH. Due to this minor inaccuracy, the preferred form of the invention operates in accordance with Equation 10 which is herein referred to as the modified form of the Clausius-Clapeyron equation. However, since it occasionally may be desirable to provide a relative humidity indication in accordance with Equation 9, the exact form of the Clausius-Clapeyron equation, the invention provides analog circuits for determining relative humidity in accordance with either equation, as desired.

Turning now to the drawings, FIG. 1 is a partially block and partially schematic diagram illustrating a preferred form of the invention. The portion of FIG. 1 outside the dashed block illustrates an analog circuit for calculating relative humidity in accordance with the modified form of the Clausius-Clapeyron equation (Equation 10). The total circuit of FIG. 1 (both inside and outside of dashed block) illustrates an analog circuit for calculating relative humidity in accordance with the exact form of the Clausius-Clapeyron equation (Equation 9).

The portion of FIG. 1 outside of the dashed block comprises: two temperature sensing transducers designated T1 and T2; two operational amplifiers designated A1 and A2; eleven resistors R1 through R11; a potentiometer designated P1; a divider 11; and, an expoential amplifier 13. The portion of FIG. 1 inside of the dashed block comprises four resistors designated R12 through R15 and a multiplier 15.

While the ideal temperature sensing transducers, T1 and T2, are platinum or nickel resistance thermometers, precision thermistors provide sufficient linearity and large signals over a range of about 10% in terms of absolute temperature over the normal range of use of the invention (about +5 to 40° C.). Hence, relatively inexpensive thermistors can be utilized by the invention. The dew point transducer is T1 and the dry bulb or absolute temperature transducer is T2. The dew point for any particular gaseous environment is determined by any suitable dew point hygrometer such as the model 880 hygrometer manufactured by Cambridge Instrument Corporation, division of Edgerton, Germeshausen and Greer, Cambridge, Mass. This particular instrument contains a mirror held at the dew point by optical sensors controlling a thermoelectric cooler. A thermistor is embedded in the mirror and provides the desired dew point signal. The dry bulb temperature is sensed by an identical thermistor mounted in the gaseous test environment.

One side of both T1 and T2 are connected to a suitably regulated positive voltage source designated +V1. The other side of T1 is connected through R1 to the negative input A1. The negative input of A1 is also connected to a negative voltage source designated −V through R3, and through R5 to the output of A1. The positive input of A1 is grounded.

The other side of T2 is connected through R2 to the negative input of A2. The negative input of A2 is also connected through R4 to −V and through R7 to the output of A1. R6 is connected between the negative input and the output of A2. The positive input of A2 is grounded.

The output of A1 is connected through R10 to the denominator input, D, of the divider 11. The output of A2 is connected through R8 to the numerator input, N, of the divider 11 and through R9 to the denominator input. In addition, −V is connected through R11 to the denominator input. The multiplier input M of the divider is connected through P1 to +V. The output of the divider 11 is connected to the input of the exponential amplifier 13. The output of the exponential amplifier is connected to an output terminal designated RH.

Turning now to a description of the operation of the portion of the circuit illustrated in FIG. 1 outside of the dashed line, as stated about, T1 measures the dew point temperature $T_1$ and T2 measures the dry bulb temperature $T_2$. Hence, the $T_1$ and $T_2$ signals are present at the negative inputs of A1 and A2. $-\overline{T}$ is derived from the −V voltage source. That is, −V through resistors R3 and R4 present to the negative input of both A1 and A2 a signal that represents $-\overline{T}$. Consequently, A1 receives at its negative input a $T_1$ signal and a $-\overline{T}$ signal. These signals are sumed at the negative input of A1 resulting in the output of A1 representing $-T_1'$. In addition to $T_2$ and $-\overline{T}$, A2 also receives the $-T_1'$ signal, generated by A1, at its negative input via R7. Hence, the output of A2 is the negative of $-\overline{T}+T_2-T_1'$ or $T_1'-T_2'$.

Thus, the divider receives: a constant input ($k$) at its multiplier input M from +V through P1; an input of $T_1'-T_2'$ at its numerator input from A1 through R8; an input $T_1'-T_2'$ at its denominator input from A2 through R9; an input of $-2T_1'$ (2 because R10 is suitably chosen with respect to the other resistors) at its denominator input from A1 through R2; and $-\overline{T}$ at its denominator input from −V through R11. When the denominator inputs are summed a denominator equation of $$-(T_1'+T_2'+\overline{T})$$

results. Consequently, the equation at the output of the divider 11 is:

$$\frac{-k(T_1'-T_2')}{T_1'+T_2'+\overline{T}} \qquad (11)$$

It will be appreciated that the foregoing equation is identical to Equation 10 above which is the modified form of the Clausius-Clapeyron equation. When the antilog of the equation is determined by the exponential amplifier the resultant signal is directly related to relative humidity.

Figure 2:
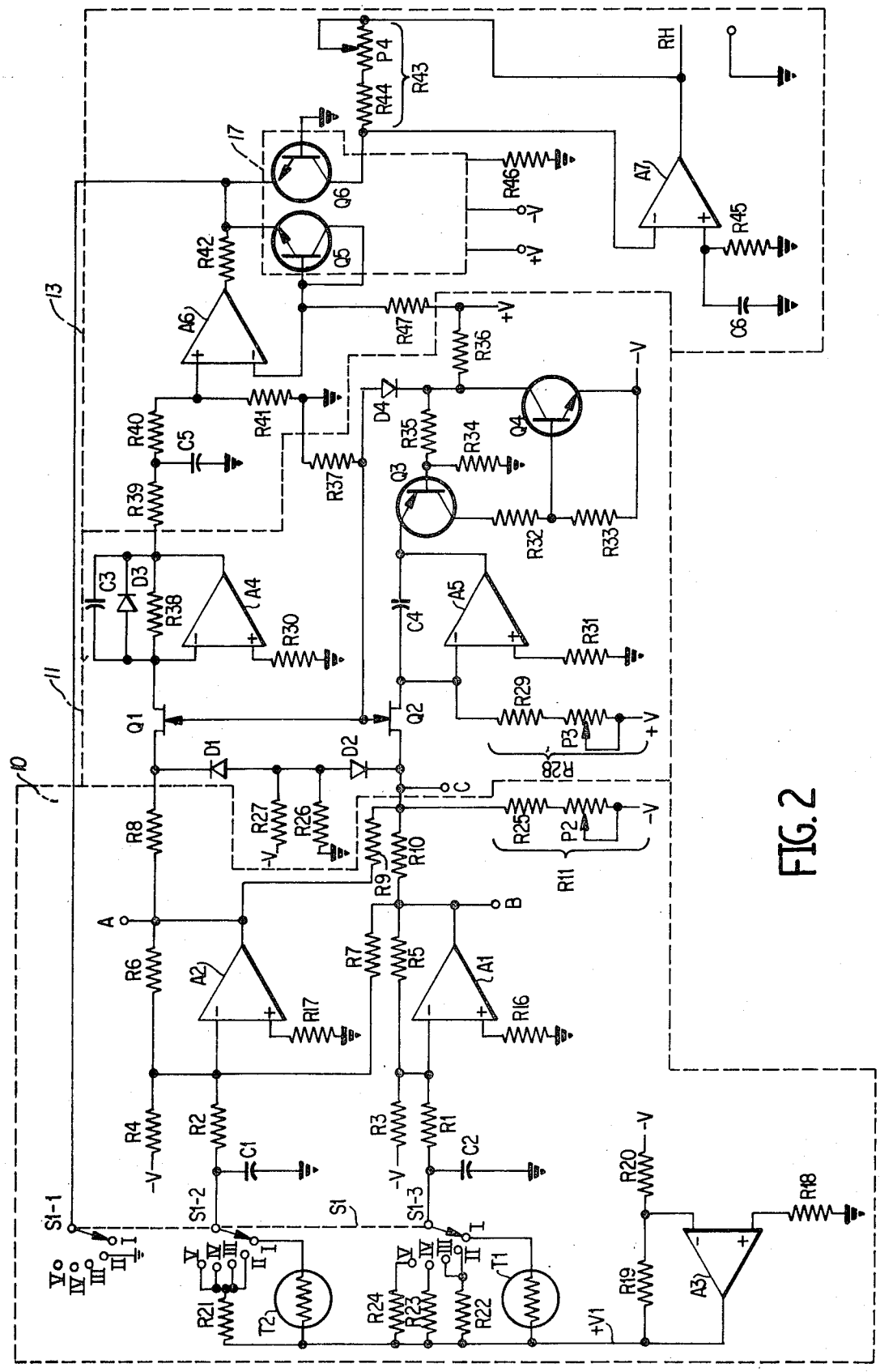
FIG. 2 is a schematic diagram illustrating an analog circuit for calculating relative humidity from temperature information in accordance with the modified form of the Clausius-Clapeyron equation.

FIG. 2 is a more complete schematic diagram of an analog computer for carrying out the calculations necessary to determine relative humidity in accordance with the modified form of the Clausius-Clapeyron equation set forth as Equation 10 above. More specifically, FIG. 2 illustrates schematically apparatus for carrying out the dividing and exponential amplifying functions illustrated and briefly discussed above with respect to FIG. 1 as well as the summing necessary to achieve the desired division. Moreover, FIG. 2 illustrates a means for calibrating the analog computer.

The summing and calibrating portion of FIG. 2 is on the left and is bounded by dashed line 10. The summing and calibrating portion includes ten additional resistors (designated R16 through R25) over and above the eleven resistors (R1–R11) illustrated in FIG. 1; two capacitors designated C1 and C2; a switch designated S1; and, a third operational amplifier designated A3. R16 is connected between the positive input of A1 and ground and R17 is connected between the positive input of A22 and ground. R18 is connected between the positive input of A3 and ground. R19 is connected between the output and the negative input of A3. R20 is connected between −V and the negative input— of A3. The output of A3 provides the voltage designated +V1 and illustrated in FIG. 1.

S1 is a three-layer switch and is used to provide calibration in the manner hereinafter described. Each layer of S1 includes a common terminal and five wiper terminals. For purposes of description, the first layer is designated S1–1, the second layer is designated S1–2 and the third layer is designated S1–3. Moreover, each of the five wiper terminals is designated I, II, III, IV and V in a clockwise direction. All of the wiper terminals of S1–1 are unconnected except for terminal II which is connected to ground. Wiper terminal I of S1–2 is connected to the side of T2 remote from +V. Terminals II, III, IV and V of S1–2 are connected through R21 to +V1. Wiper terminal I of S1–3 is connected to the side of T1 remote from +V. Terminals II and III of S1–3 are connected through R22 to +V1; terminal IV of S1–3 is connected through R23 to +V1; and, terminal V of S1–3 is connected through R24 to +V1.

C1 is connected between the common terminal of S1–2 and ground and C2 is connected between the common terminal of S1–3 and ground. R11 illustrated in FIG. 1 is illustrated in FIG. 2 as comprising fixed resistor R25 and a potentiometer P2. P2 allows $-\overline{T}$, at the input of the divider, to be calibrated to the desired current level.

In operation, the summing section of the summing and calibrating portion 10 of the circuit illustrated in FIG. 2 operates in exactly the same manner as the summing portion of the circuit illustrated in FIG. 1 and, hence, will not be further discussed. C1 and C2 provide isolation to eliminate any undesired AC components at the negative inputs of A1 and A2. A3 and its adjacent resistors is adapted to apply the desired bias voltage +V1 to T1 and T2. Moreover, as indicated above, P2 and R25 are merely provided so that R11 can be adjusted to provide a $-\overline{T}$ of the desired value. Finally R21–R24 and S1 are provided so that the instrument can be calibrated in the manner hereinafter described.

The divider 11 illustrated in FIG. 2 comprises: two n-channel field effect transistors designated Q1 and Q2; a PNP transistor designated Q3; an NPN transistor designated Q4; two operational amplifiers designated A4 and A5; four diodes designated D1–D4; two capacitors designated C4 and C5; and, thirteen resistors designated R26–R38.

The source terminal of Q1 is connected to the cathode of D1 and the source terminal of Q2 is connected to the cathode of D2. The anodes of D1 and D2 are connected together, through R26 to ground, and through R27 to —V. The source of Q1 is also connected to the side of R8 remote from A2 and the source terminal of Q2 is also connected to the junction between R9, R10 and R11. The positive input of A4 is connected through R30 to ground. The drain terminal of Q1 is connected to the negative input of A4. R38, D3 and C3 are all connected in parallel between the negative input and the output of A4 with the anode of D3 being connected to the negative input of A4.

The positive input of A5 is connected to ground through R31. The drain terminal of Q2 is connected to the negative input of A5. The negative input of A5 is also connected through R28 to a positive voltage source designated +V. R28 actually comprises R29 and a potentiometer designated P3. C4 is connected between the output of A5 and the negative input of A5.

The output of A5 is connected to the emitter of Q3. The collector of Q3 is connected through R32 in series with R33 to —V. The junction between R32 and R33 is connected to the base of Q4. The emitter of Q4 is connected to —V. The base of Q3 is connected through R34 to ground and through R35 to the collector of Q4. The collector of Q34 is also connected to the cathode of D4. The anode of D4 is connected to the gates of Q1 and Q2 and through R37 to ground. The cathode of D4 is also connected through R36 to +V.

Figure 3:
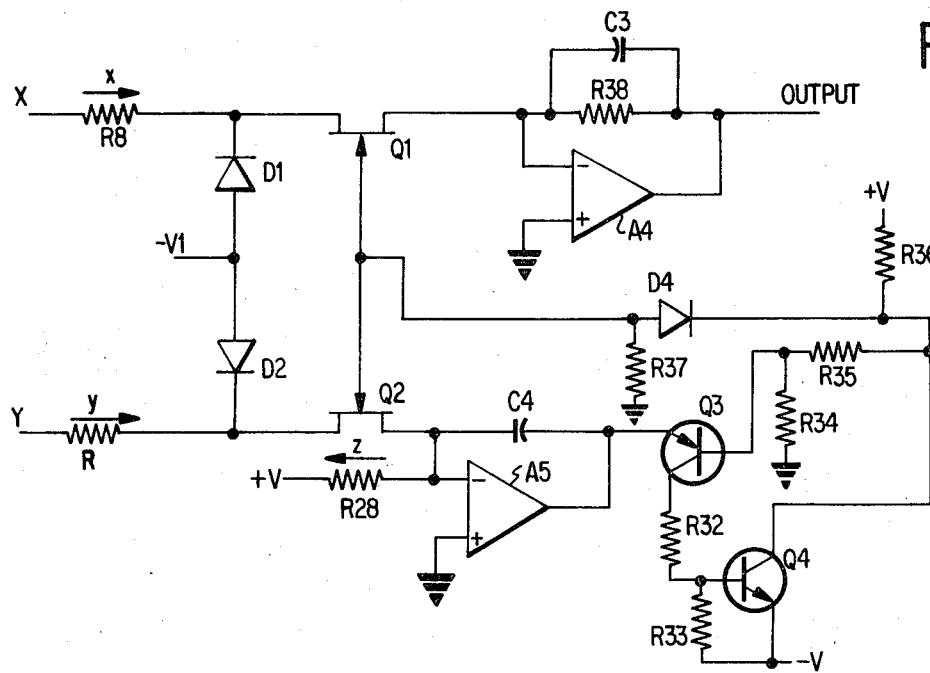
FIG. 3 is a schematic diagram illustrating a simplified form of the divider portion of the circuit illustrated in FIG. 2.

For ease of description of the operation thereof, the divider portion of FIG. 2 is illustrated in somewhat simplified form in FIG. 3. In general FIG. 3 merely eliminates components unnecessary to the understanding of the operation of the divider circuit and combines the resistance inputs to the junction between D2 and Q2 into a single component designated R, the remaining components being designated the same as in FIG. 2.

Turning now to a description of the operation of the divider 11 illustrated in FIGS. 2 and 3, with particular reference to FIG. 3, negative signal voltages X and Y are applied to the drain terminals of Q1 and Q2 through resistors R8 and R respectively to cause current flow $x$ and $y$ through R8 and R respectively. Current flows $x$ and $y$ are switched by Q1 and Q2 so as to allow these currents to either pass to the amplifiers A4 and A5 or to be shunted through D1 and D2.

Q1 and Q2 are switched by Q3 and Q4 acting as a Schmitt trigger. Specifically, the collector of Q4 switches between ±V as the output of A5 reaches a predetermined plus and minus voltage which is considerably lower than ±V. For example, if ±V is ±15 volts, the output of A5 may switch when it reaches ±6 volts. More specifically, A5 is connected as an integrator; that is, the output of A5 is the time integral of the sum of its input currents. If it is assumed for purposes of discussion that Q4 is in its +V voltage output state, then Q1 and Q2 are switched on and pass their respective currents $x$ and $y$. If the current through Q2 ($y$) is greater than the current from +V through R28 ($z$), then electrons will flow to the summing junction at the negative input of A5. When this occurs A5's output will integrate in a positive direction at a rate proportional to the current from Q2 minus the current through R28, i.e., $y-z$. When the output of A5 reaches the predetermined positive voltage state, Q4 switches to its —V voltage state thereby turning off Q1 and Q2. When this occurs, the current through Q2 is shunted through D2 and the only input to A5 is a constant current from +V through R28 ($z$). A5 then integrates negative at a rate proportional to the current flow through R28 from +V. When the output reaches the predetermined negative voltage state, Q4 switches back to the +V voltage state thereby turning on Q1 and Q2. Thereafter, the process repeats itself.

Since the output of A5 varies linearly between two fixed limits, the average output of A5 is a constant. Thus, the average input current to A5 is 0 (zero), i.e., the current through R28 ($z$) is equal to the current through Q2 ($y$).

Consequently, the average current through Q2 is the negative of the average current through R28. Thus, the current through Q2 ($y$) times the duty factor (DF) of Q2 equals the negative of the current through R28 ($-z$) or in equation form: $DF=-z/y$. Since $y$ can be represented by the voltage Y divided by the input resistance R, the foregoing equation can be set forth as $DF=-zR/Y$.

The voltage at the source terminal of Q1 ($x$) is amplified by A4. The average gain of A4 can be represented by the feedback resistance R38 of A4, the input resistance R8 to the source of Q1 and the duty factor (DF) of Q1. Set forth in equation form this is $$\frac{-(DF)(R38)}{(R8)}$$

Since the duty factor can range from 0 to 1.0, the magnitude of $y$ must be greater than the magnitude of $z$.

The output of A4 can be represented by the following equation:

$$\text{output} = \frac{-X(R38)(R)Z}{(R8)Y}$$

$$= \text{constant} \frac{X}{Y} \text{ only when } \left|\frac{Y}{R}\right| > |Z| \qquad (12)$$

It should be noted that the foregoing equation does not depend on the switching points of Q4 provided they do not change at a significant rate compared with the switching rate. The storage capacitor C3 averages the pulses into A4 so that the output of A4 is a steady DC signal.

In the actual computation circuit, the numerator of Equation 9 above is proportional $T_1'-T_2'$, a negative voltage since $T_2'$ is greater than $T_1'$. It is applied to A4 via R8 and Q1. The denominator signal for Equation 9 is the sum of three currents proportional to $T_1'-T_2'$ through R9, $-2T_1'$ through R10, and the constant $-\overline{T}$ through R11. R28 provides the constant current $z$ discussed above and is made adjustable to vary the proportionality constant. The output of A3 is thus represented by the following equations:

$$\frac{z(T_1'-T_2')}{T_1'-T_2'-2T_1'-\overline{T}} = \frac{-z(T_1'-T_2')}{T_1'+T_2'+\overline{T}} \qquad (13)$$

The foregoing signal, a positive voltage, is proportional to —log relative humidity. The exponential amplifier 13 takes the antilog of this signal and provides a voltage signal related to relative humidity.

The exponential amplifier 13 portion of the circuit illustrated in FIG. 2 comprises: two operational amplifiers designated A6 and A7; two capacitors designated C5 and C6 and, nine resistors designated R39 through R47. The exponential amplifier also includes a pair of matched NPN transistors Q5 and Q6 held at a predetermined temperature by a suitable temperature regulation circuit illustrated by a dashed line 17 surrounding these transistors in FIG. 2. Regulation is electrically provided by connecting positive and negative sources +V and —V to the regulation system and a resistor R46 between the regulation system and ground. Preferably, the functional block containing Q5 and Q6 and the temperature regulator is an integrated circuit such as temperature regulated integrated circuit 726C sold by Fairchild Semiconductor Company of Mountain View, Calif.

The positive input of A6 is connected through R39 and R40 connected in series to the output of A4. The junction between R39 and R40 is connected through C5 to ground. The positive input of A6 is also connected through R41 to ground. The output of A6 is connecetd to the emitters of Q5 and Q6 through R42. The base and collector of Q5 are connected together and to the negative input of A6. The base and collector of Q5 are also connected through R47 to +V. The base of Q6 is connected to ground. The collector of Q6 is connected to the negative input of A7. The positive input of A7 is connected through C6 and R45 connected in parallel to ground. The output of A7 is connected through R43 to the negative input of A7. R43 actually comprises a fixed resistor R44 and a potentiometer P4. The output of A7 is also connected to the RH terminal.

Turning now to a description of the operation of the exponential amplifier 13 illustrated in FIG. 2, the differential collector current of Q5 and Q6 is an exponential function of the differential base voltages of these transistors given by the following equation:

$$\frac{I_{CQ6}}{I_{CQ5}} = \exp\left[k(V_{beQ6} - V_{beQ5})\right] \quad (14)$$

where $k$ is a constant dependent on the absolute temperature of Q5 and Q6. At a 400° K. operating temperature one such circuit has a $k$ of approximately 80 millivolts/decade.

R39, R40 and R41 attenuate the output of A4 to the required voltage level for the operation of the exponential amplifier. The voltage across Q5 is constant because the current through Q5 is set by R47 and flows from Q5 to the output of A6. The output of A6 at the emitter of Q5 follows the voltage at the plus input of A6 with a voltage offset equal to $V_{beQ5}$. The base of Q6 is grounded so that $V_{beQ6} = V_{beQ5} - V_{R41}$. The collector current of Q6 is an exponential function of $V_{beQ6}$ and is converted to a voltage by A7.

When RH=100%, $T_2-T_1$ and $V_{R41}$ is 0. Then $$V_{beQ6} = V_{beQ5} \text{ and } I_{CQ6} = I_{CQ5}$$

and the output of A7 is at a maximum. As the relative humidity decreases, $T_2-T_1$ increases and $V_{R41}$ increases proportionally, causing an exponential decrease in $I_{CQ6}$. The output of A7 is therefore proportional to relative humidity.

Figures 4, 5:
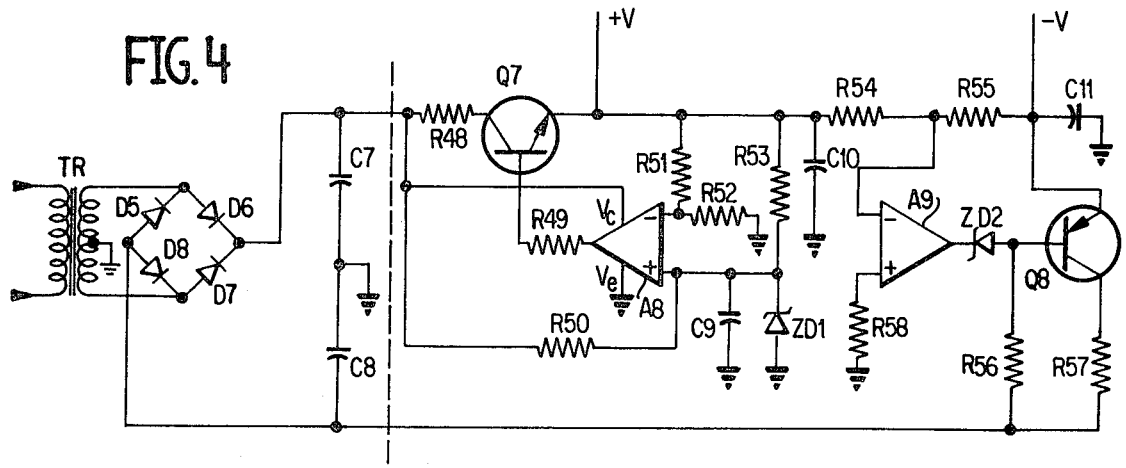
FIG. 4 is a schematic diagram illustrating a power supply suitable for use with the embodiment of the invention illustrated in FIG. 2.
FIG. 5 is a schematic diagram illustrating a modification to the circuit illustrated in FIG. 2 which allows the overall circuit to calculate relative humidity in accordance with the exact solution to the Clausius-Clapeyron equation.

FIG. 4 is a schematic diagram of a power supply suitable for supplying the +V and −V voltages to an analog computer circuit of the type illustrated in FIG. 2 and described above. The power supply illustrated in FIG. 3 comprises: a transformer designated TR; four diodes designated D5 through D8; five capacitors designated C7 through C11; two Zener diodes designated ZD1 and ZD2; an NPN transistor designated Q7; a PNP transistor designated Q8; two operational amplifiers designated A8 and A9; and, eleven resistors designated R48 through R58.

The primary winding of TR is fed by a suitable AC source such as a conventional 117 v. AC power line. TR is a step down transformer and its secondary winding is center tapped. The ends of the secondary winding are connected to one pair of opposing terminals of a bridge circuit formed by D5, D6, D7 and D8. The other pair of opposing terminals of the bridge are connected to one terminal of C8 and to one terminal of C7. The other terminals of C7 and C8 are connected together and to ground. Hence, the transformer, diode bridge and capacitors form a circuit that creates both a positive and a negative rectified and filtered DC voltage. The ungrounded side of C7 is connected through R48 to the collector of Q7, to the Vc terminal of A8 and through R50 to the positive input of V8. The Ve terminal of A8 is grounded for reasons hereinafter described. The base of Q7 is connected through R49 to the output of A8.

The emitter of Q7 is connected to an output terminal designated +V and through R51 in series with R52 to ground. The junction between R51 and R52 is connected to the negative input of A8. The emitter of Q7 is also connected through R53 in series with ZD1 to ground. C9 is connected in parallel with ZD1. The junction between R53 and ZD1 is also connected to the positive input of A8. The emitter of Q7 is further connected through C10 to ground and to one terminal of R54. The other terminal of R54 is connected to the negative input of A9 and through R55 in series with C11 to ground. The junction between R55 and C11 is connected to an output terminal designated −V and to the emitter of Q8. The base of Q8 is connected through ZD2 to the output of A9. The positive input of A9 is connected through R58 to ground. The base and collector of Q8 are connected together through connected R56 in series with R57. The junction between R56 and R57 is connected to the ungrounded side of C8.

The various circuit components on the right side of the dashed line in FIG. 4 in combination with the operational amplifiers provide regulation for the +V and −V outputs. More specifically, the +V output is regulated by A8 and series pass transistor Q7. A8 receives its supply voltage from ground and the top of C7 to allow its output to reach +V. ZD1 acts as a reference diode and sets the voltage that controls the operation of A8. A8 in turn controls the passage of current through Q7 and thus the voltage +V is controlled.

A9 and Q8 regulate the −V output by using the +V output as a reference. That is, the +V output supplies a voltage to one input of A9 to control A9's output. A9's output controls Q8 through ZD2 which in turn controls or regulates the −V output. The −V output is used as a reference for A3 (FIG. 2) so that a lower regulated voltage is applied to the transducers T1 and T2 to prevent self-heating.

As generally indicated above S1 allows the analog computer illustrated in FIG. 2 to be calibrated by utilizing a plurality of resistors that simulate various temperatures being sensed by T1 and T2. That is, positions III, IV, and V of the five positions of S1 present resistors to the negative inputs of A1 and A2 which simulate relative humidities of, 100%, 54% and 39%, for example. Position number II grounds the emitters of Q5 and Q6 giving a signal equal to 0% relative humidity. Position number I connects T1 and T2 to the negative inputs of A1 and A2 and is the operative position for the instrument.

To adjust the computer it is only necessary to determine the value of R11 which supplies a current proportional to the chosen $\overline{T}$. In one operative embodiment, it was found that the average temperature versus conductance slope for the combination of a thermistor (T1) and a resistor (R1) was 9 micromohs/° C. If it is assumed that R1=R2, R3=R4, R5=R6=R7 and R9=2R10, the required value for R11 can be found from the following formula:

$$R11 = \frac{(R9)(R20)}{(\Delta \text{ cond.}/° \text{ C.})(\overline{T}_{\text{kelvin}})(R6)(R19)} \quad (15)$$

R11 is adjusted to the value that results from inserting suitable figures in the above equation. Thereafter, S1 is turned to position III and R43 is adjusted so that a predetermined voltage such as +10 volts for example, occurs at terminal RH. This voltage is then equal to 100% relative humidity. S1 is then set to position V and R28 is adjusted so that the voltage at RH is proportional to the desired value. For example, if the equivalent RH is 39% for the resistance value of R24, R28 is adjusted so that the RH voltage is 3.9 volts. The switch can then be set to the IV position for an intermediate or further output check, if desired.

The foregoing description has described an uncomplicated analog computer suitable for determining relative humidity from dew point and temperature data in accordance with a modified form of the Clausius-Clapeyron equation. As indicated above, this calculation is quite accurate, having an error of less than 1% in normal ranges of interest, even though a term has been dropped from the denominator of the equation. However, in some environments it may be desirable to eliminate even this minor error and calculate in accordance with the exact Clausius-Clapeyron equation. If so, the portion of the circuit surrounded by dashed lines in FIG. 1 must be added. The portion of FIG. 1 surrounded by dashed lines comprises a multiplier 15 and four resistors previously designated R12 through R15.

One end of R12 is connected to the output of A2 and to one input of the multiplier 15. The output of A1 is connected through R13 to the same input of the multiplier 15. Thus, that input of the multiplier receives the sum of $T_1'-T_2'-T_1'$ for a total input of $-T_2'$. The second input of the multiplier is only connected to the output of A1 through R14 and, thus, only receives a $-T_1'$ input. Multiplying these two inputs together results in the output from the multiplier of $-T_1'T_2'$ which can be divided by a suitable amount such as $\bar{T}$ so that the final output is $$-\frac{T_1'T_2'}{\bar{T}}$$

This output is presented to the denominator input (D) of the divider 11 through R15. Thus, the last term necessary to the axact solution of the Clausius-Clapeyron equation is also presented to the denominator input of the divider. Consequently the divider now divides in accordance with the axact equation.

FIG. 5 illustrates a multiplier circuit for carrying out the multiplication described above to provide the desired $$-\frac{T_1'T_2'}{\bar{T}}$$

signal. Points A, B and C of this circuit are connected to points A, B, and C of FIG. 2 for correct overall operation.

The circuit illustrated in FIG. 5 comprises four operational amplifiers designated A10, A11, A12, and A13; an n-channel field effect transistor designated Q9; a PNP transistor designated Q10; an NPN transistor designated Q11; a diode designated D9; two capacitors designated C12 and C13; and, nineteen resistors designated R59 through R77.

The A terminal of FIG. 5 is connected through R61 to the negative input of A12. The positive input of A12 is connected through R65 to ground. The output of A12 is connected via C13 to its negative input. The B terminal of FIG. 5 is connected through R70 to the drain terminal Q7, through R59 to the negative input of A10 and through R60 to the negative input of A12. The positive input of A10 is connected through R63 to ground. The output of A10 is connected via R62 to its negative input and through R66 the source terminal of Q9. The source terminal of Q9 is also connected through D10 to ground.

The positive input of A11 is connected through R69 to ground. The output of A11 is connected through C12 in parallel with R67 to its negative input. The output of A11 is also connected through R68 to terminal C. The gate of Q9 is connected through R71 to ground and to the anode of D9. The cathode of D9 is connected through R64 to the negative input of A12, through R72 in series with R74 to ground and to the collectors of Q10 and Q11. The output of A12 is connected through R73 to the junction between R72 and R74. The junction between R72 and R74 is also connected to the positive input of A13. The negative input of A13 is connected to ground. The main output of A13 is connected through R76 to ground. In addition to its main output, the $Vc$ and $Ve$ terminals of A13 are used as switching outputs. The $Vc$ terminal of A13 is connected to the base of Q10 and through R77 to the emitter of Q10 and to a $+V$ terminal. The $Ve$ terminal of A13 is connected to the base of Q11 and through R75 to the emitter of Q11. The emitter of Q11 is also connected to a $-V$ terminal.

With no voltage on points A or B, A12 integrates up and down due to the output of Q10–Q11 driving current through R64. Since $+V=-V$, the rate of integration is the same in either direction and the duty factor of the output of Q10–Q11 is 0.5. If signal currents $m$ flow through R60 or R61, the duty factor changes so that the average current $n$ through R64 equals the signal current since the sum into C13 must average zero. Therefore the duty factor ($df$) which is the percentage "on" time of Q9 is controlled by $m$. Thusly:

$$df = \frac{1}{2} - \frac{m}{2n} \quad (16)$$

For preferred operation $R59=R62=R67=2R66$. Under these conditions, A10 acts an inverter whose output is equal to $-M$, where M is the signal voltage on terminal B. When the output of Q10–Q11 is $-V$ volts, Q9 is "off" and the output of A11 is equal to $-M$ (A11 has a gain of $-1$). When the output of Q10–Q11 is $+V$ volts, Q9 is "on" and the output of $$A11 + -(M-2M) = M$$

(A11 has a gain of $+1$). D10 prevents large values of M from keeping Q9 turned on.

C12 causes the output of A11 to be the time average of the input pulsations caused by the switching of Q9 so that the output of A11 is:

$$(df)M - (1-df)M = (2df-1)M \quad (17)$$

or $$\left[2\left(\frac{1}{2}-\frac{m}{2n}\right)-1\right]M = \frac{-m}{n}M \quad (18)$$

A13, Q10–Q11 and R73–R77 form an accurate Schmitt trigger circuit. The $Vc$ and $Ve$ terminals of A13 are used as outputs because they are convenient to drive Q10 and Q11. The output of A13 is grounded through a small resistance R76, such as 1000 ohms, for example. When the $+$ input of A13 is driven positive, its output swings positive, causing current to flow through R76 to ground. This same current flows into the $Vc$ terminal, causing Q10 to turn on and pull its collector to $+V$ volts. If the $+$ input of A13 is driven negative, current flows through R76 to the $Ve$ terminal, turning on Q11 and driving its collector to $-V$ volts. R75 and R77 pass the idling current of A13 so that Q10 and Q11 are not on at the same time. The advantage of this circuit over a conventional Schmitt trigger is that the output of Q10–Q11 is very close to $\pm V$ whereas the output of A13 can only approach within about 2 volts of $\pm V$. Positive feedback through R72 causes the trigger action.

A12 and A13 oscillate in a manner identical to that of A5 and Q3–Q4 in the divider. The output of A12 integrates up and down between the limits ($\pm V$) R72/R73 (typically $\pm 6$ volts). R74 serves to limit the voltage swing at the input of A13 to prevent overload and has no effect on the limits.

$n$ is a constant, therefore:

$$\text{output} \propto -mM$$

Since input A is proportional to $T_1'-T_2'$, input B is proportion to $-T_1'$ and assuming $R60=R61$, then:

$$\text{output } A11 \propto -(T_1'-T_2'-T_1')(-T_1')$$
$$\propto -(-T_2')(-T_1')(-T_1')$$
$$\propto -T_1'T_2'$$

By appropriately choosing the value of R68 the current of point C is equal to:

$$-\frac{T_1'T_2'}{\bar{T}}$$

This signal is applied via terminal C to the denominator input of the divider where it represents the last term in the denominator of the exact Clausius-Clapeyron equation.

Other than the addition of the $$-\frac{T_1'T_2'}{\bar{T}}$$

term, the circuit of FIG. 2 operates in exactly the same manner as described above for the modified form of the Clausius-Clapeyron equation. Hence, it will not be further described here.

It will be appreciated that the foregoing description has described analog circuits for determining relative humidity from two temperature signals—one representing dew point and the other dry bulb. The invention is uncomplicated electronically and does not require the use of expensive temperature sensors. Hence, it is suitable for widespread use in determining the relative humidity of a variety of gaseous mediums, including air. It can also be used for sensing the saturation ratio of any substance of suitable property.

While preferred embodiments of analog circuits for calculating relative humidity in accordance with either an exact or a modified form of the Clausius-Clapeyron equation have been illustrated and described, it is to be understood that various modifications can be made therein commensurate with the spirit and scope of the invention.

The embodiments of the invention in which an exclusive property or privilege is claimed are defined as follows:

1. An apparatus for providing an output signal related to the relative humidity (RH) of a gaseous sample comprising:
    first sensor means for providing a signal $T_1$ proportional to the dew point of said gaseous sample;
    second sensor means for providing a signal $T_2$ proportional to the absolute temperature of said gaseous sample; and,
    computation means connected to said first and second sensor means for solving the equation:

$$\ln RH \approx k \frac{T_1' - T_2'}{\overline{T} + T_1' + T_2'}$$

wherein $T_1 = \overline{T} + T_1'$, $T_2 = \overline{T} + T_2'$, and $\overline{T}$ and $k$ equal constants.

2. Apparatus as claimed in claim 1 wherein said computation means includes antilog means for obtaining the antilog of the equation:

$$k \frac{T_1' - T_2'}{\overline{T} + T_1' + T_2'}$$

3. Apparatus as claimed in claim 2 wherein said computation means comprises an analog circuit including means for generating a signal representing $\overline{T}$;
    first signal combining means, connected to receive signals $T_1$ and $\overline{T}$, for generating a $T_1'$ signal; and,
    second signal combining means, connected to receive signals $T_2$, $\overline{T}$ and $T_1'$, for generating a $T_1' - T_2'$ signal.

4. Apparatus as claimed in claim 3 wherein said analog circuit also includes a divider having numerator and denominator inputs, said numerator input connected to said second signal combining means to receive said $T_1' - T_2'$ signal and said denominator input connected to said first and second signal combining means to receive a sum signal $\overline{T} + T_1' + T_2'$.

5. Apparatus as claimed in claim 4 wherein said first signal combining means is a first differential amplifier and wherein said second signal combining means is a second differential amplifier.

6. Apparatus as claimed in claim 5 wherein said antilog means is an exponential amplifier.

7. Apparatus as claimed in claim 6 wherein said divider comprises:
    a first switch connected to receive said $T_1' - T_2'$ signal;
    a second switch connected to receive said $\overline{T} + T_1' + T_2'$ signal; and,
    switching means connected to said first and second switches to switch said first and second switches in a manner such that the $T_1' - T_2'$ signal is divided by the $\overline{T} + T_1' + T_2'$ signal.

8. Apparatus as claimed in claim 1 wherein said computation means cmprises an analog circuit including:
    means for generating a signal representing $\overline{T}$;
    first signal combining means, connected to receive signals $T_1$ and $\overline{T}$, for generating a $T_1'$ signal; and,
    second signal combining means, connected to receive signals $T_2$, $\overline{T}$ and $T_1'$, for generating a $T_1' - T_2'$ signal.

9. Apparatus as claimed in claim 8 wherein said analog circuit also includes a divider having numerator and denominator inputs, said numerator input connected to said second signal combining means to receive said $T_1' - T_2'$ signal and said denominator input connected to said first and second signal combining means to receive a sum signal $\overline{T} + T_1' + T_2'$.

10. Apparatus as claimed in claim 9 wherein said first signal combining means is a differential amplifier and wherein said second signal combining means is a second differential amplifier.

11. Apparatus as claimed in claim 10 wherein said divider comprises:
    a first switch connected to receive said $T_1' - T_2'$ signal;
    a second switch connected to receive said $\overline{T} + T_1' + T_2'$ signal; and,
    switching means connected to said first and second switches to switch said first and second switches in a manner such that the $T_1' - T_2'$ signal is divided by the $\overline{T} + T_1' + T_2'$ signal.

12. An apparatus for providing an output signal related to the relative humidity (RH) of a gaseous sample, comprising:
    first sensor means for providing a signal $T_1$ proportional to the dew point of said gaseous sample;
    second sensor means for providing a signal $T_2$ proportional to the absolute temperature of said gaseous sample; and,
    computation means connected to said first and second sensor means for solving the equation:

$$\ln RH \approx k \frac{T_1' - T_2'}{\overline{T} + T_1' + T_2' + \frac{T_1' T_2'}{\overline{T}}}$$

wherein $T_1 = \overline{T} + T_1'$, $T_2 = \overline{T} + T_2'$, and $\overline{T}$ and $k$ equal constants.

13. Apparatus as claimed in claim 12 wherein said computation means includes antilog means for obtaining the antilog of the equation:

$$k \frac{T_1' - T_2'}{\overline{T} + T_1' + T_2' + \frac{T_1' T_2'}{\overline{T}}}$$

14. Apparatus as claimed in claim 13 wherein said computation means comprises an analog circuit including:
    means for generating a signal representing $\overline{T}$;
    first signal combining means, connected to receive signals $T_1$ and $\overline{T}$, for generating a $T_1'$ signal; and
    second signal combining means, connected to receive signals $T_2$, $\overline{T}$ and $T_1'$, for generating a $T_1' - T_2'$ signal.

15. Apparatus as claimed in claim 14 wherein said analog circuit includes a multiplier connected to said first and second signal combining means so as to receive a $T_1'$ signal at one input and $T_2'$ signal at a second input and to generate a signal $$\frac{T_1' T_2'}{\overline{T}}$$

16. Apparatus as claimed in claim 15 wherein said analog circuit also includes a divider having numerator and denominator inputs, said numerator input connected to said second signal combining means to receive said $T_1' - T_2'$ signal and said demoninator input connected to said first and second signal combining means and to said multiplier to receive a sum signal $$\overline{T} + T_1' + T_2' + \frac{T_1' T_2'}{\overline{T}}$$

17. Apparatus as claimed in claim 16 wherein said first signal combining means is a first differential amplifier and wherein said second signal combining means is a second differential amplifier.

18. Apparatus as claimed in claim 17 wherein said antilog means is an exponential amplifier.

19. Apparatus as claimed in claim 18 wherein said divider comprises:

a first switch connected to receive said $T_1'-T_2'$ signal;
a second switch connected to receive said $$\overline{T}+T_1'+T_2'+\frac{T_1'T_2'}{\overline{T}}$$

signal; and, switching means connected to said first and second switches to switch said first and second switches in a manner such that the $T_1'-T_2'$ signal is divided by the $$\overline{T}+T_1'+T_2'+\frac{T_1'T_2'}{\overline{T}}$$

signal.

20. Apparatus as claimed in claim 12 wherein said computation means comprises an analog circuit including:
   means for generating a signal representing $\overline{T}$;
   first signal combining means, connected to receive signals $T_1$ and $\overline{T}$, for generating a $T_1'$ signal; and,
   second signal combining means, connected to receive signals $T_2$, $\overline{T}$ and $T_1'$, for generating a $T_1'-T_2'$ signal.

21. Apparatus as claimed in claim 20 wherein said analog circuit includes a multiplier connected to said first and second signal combining means so as to receive a signal $T_1'$ at one input and signal $T_2'$ at a second input and to generate a signal $$\frac{T_1'T_2'}{\overline{T}}$$

at its output.

22. Apparatus as claimed in claim 21 wherein said analog circuit also includes a divider having numerator and denominator inputs, said numerator input connected to said second signal combining means to receive said $T_1'-T_2'$ signal and said denominator input connected to said first and second signal combining means and to said multiplier to receive a sum signal $$\overline{T}+T_1'+T_2'+\frac{T_1'T_2'}{\overline{T}}$$

23. Apparatus as claimed in claim 22 wherein said first signal combining means is a first differential amplifier and wherein said second signal combining means is a second differential amplifier.

24. Apparatus as claimed in claim 23 wherein said divider comprises:
   a first switch connected to receive said $T_1'-T_2'$ signal;
   a second switch connected to receive said $$\overline{T}+T_1'+T_2'+\frac{T_1'T_2'}{\overline{T}}$$

signal; and, switching means connected to said first and second switches to switch said first and second switches in a manner such that $T_1'-T_2'$ signal is divided by the $$\overline{T}+T_1'+T_2'+\frac{T_1'T_2'}{\overline{T}}$$

signal.

References Cited

UNITED STATES PATENTS 2,873,607    2/1959    Van Kuyk _____ 73—335

OTHER REFERENCES

"Electronic Analog Computers (D-C Analog Computers);" G. A. Korn and T. M. Korn, McGraw-Hill, 1956, pp. 399–407.

MALCOLM A. MORRISON, Primary Examiner

E. J. WISE, Assistant Examiner

U.S. Cl. X.R.

235—184, 185; 73—335, 336.5